US005462299A

United States Patent [19]
Maddux

[11] Patent Number: 5,462,299
[45] Date of Patent: Oct. 31, 1995

[54] TRAY AND DISH CART

[75] Inventor: Larry D. Maddux, Westminster, Calif.

[73] Assignee: Cambro Manufacturing Company, Huntington Beach, Calif.

[21] Appl. No.: 116,006

[22] Filed: Sep. 2, 1993

[51] Int. Cl.⁶ .................................................. B62B 3/02
[52] U.S. Cl. ..................... 280/47.35; 211/49.1; 211/184; 280/79.3; 312/229
[58] Field of Search ..................................... 312/183, 193, 312/229, 348.3, 351; 211/88, 49.1, 126, 184; 280/47.35, 79.3, 79.2

[56] References Cited

U.S. PATENT DOCUMENTS

| | | | |
|---|---|---|---|
| 2,747,959 | 5/1956 | Ingelson | 211/184 X |
| 2,972,421 | 2/1961 | Frick | 211/184 |
| 3,939,987 | 2/1976 | Bustos et al. | 211/49.1 X |
| 4,094,526 | 6/1978 | Clarke et al. | 280/47.35 |
| 4,418,969 | 12/1983 | Hettman | 312/229 X |
| 4,503,982 | 3/1985 | Lewis | 211/184 |
| 4,538,737 | 9/1985 | Delaney | 211/184 X |
| 4,611,718 | 9/1986 | Cohn et al. | 211/184 X |
| 4,759,449 | 7/1988 | Gold | 211/184 X |
| 5,207,334 | 5/1993 | Lear | 211/184 X |

OTHER PUBLICATIONS

Advertising Brochure for InterMetro Industries Corporation.

*Primary Examiner*—Kenneth R. Rice
*Assistant Examiner*—Michael Mar
*Attorney, Agent, or Firm*—George F. Bethel; Patience K. Bethel

[57] ABSTRACT

A movable cart comprising a base member having a generally rectangular shape supported on a plurality of swivel casters and having two sidewalls joined to a rear wall, and including channels disposed within the base member and/or the walls for accommodating one or more panels for dividing the cart into two or more compartments. The panels have a double flanged edge sized to fit into the channels of the base member and a single flange sized to fit into the channels of the walls. The panels are secured to the walls by means of a screw member which passes through the walls and is received into an internally threaded opening in the edge of the panels.

14 Claims, 3 Drawing Sheets

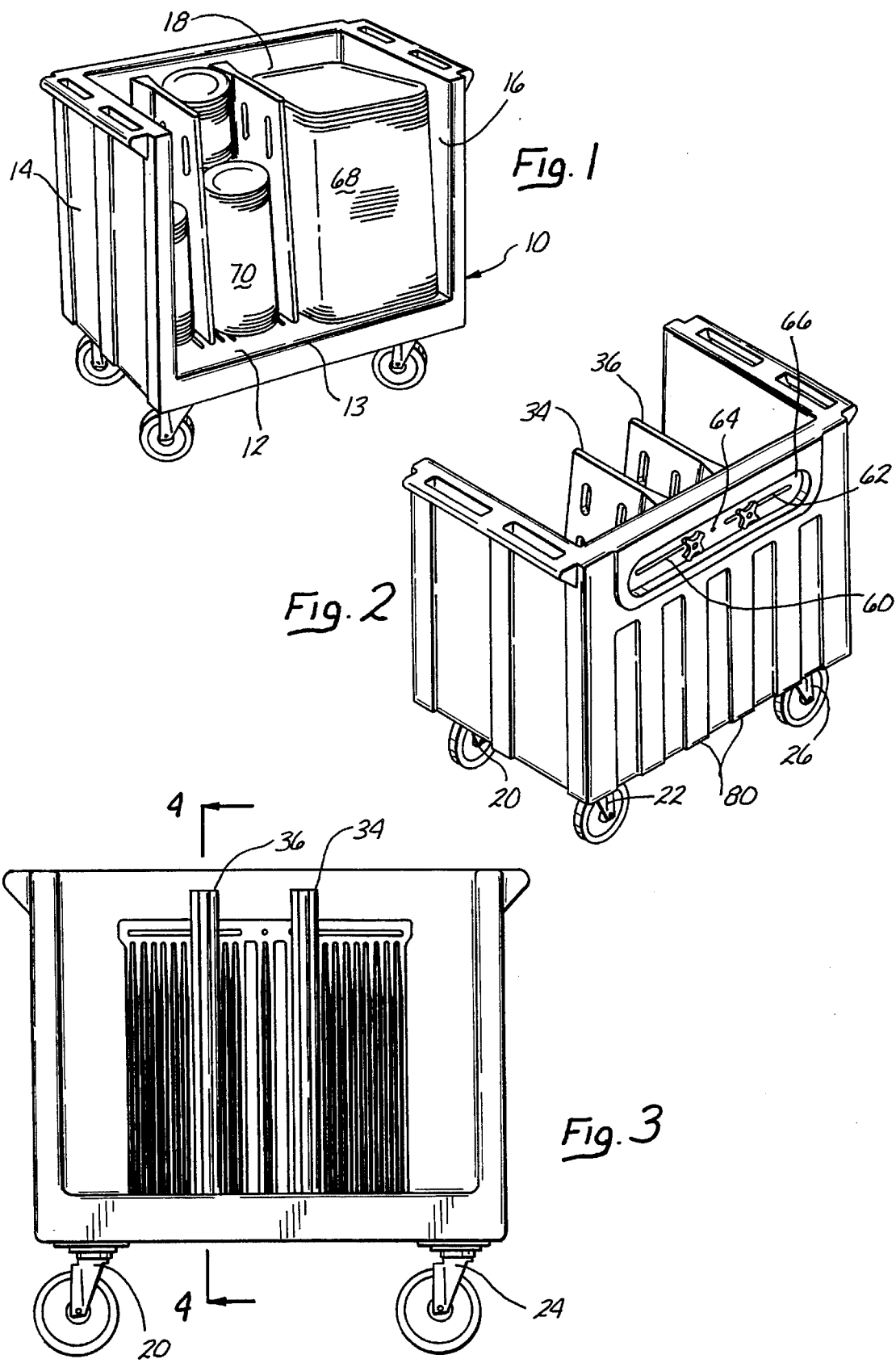

TRAY AND DISH CART

FIELD OF THE INVENTION

This invention relates to the field of dish and tray carts and in particular to a dish and tray cart having one or more adjustable and removable panels for dividing the cart into separate storage compartments for the accommodation of dishes or trays.

DESCRIPTION OF THE PRIOR ART

In restaurants and cafeterias as well as other places where large quantities of food are prepared and served, it is desirable to have the dishes and trays conveniently available. In the past dishes, trays and the like have been stored on a sideboard or table. More recently, trays, dishes, and other items for table set-up or cafeteria set-up have been stored in a wheeled cart. This allows the convenient movement of the trays or dishes to the desired location for transfer or set-up as needed.

Early carts were in the form of, for example, a two-shelf cart. The dishes and other materials were stacked conveniently within the lower shelf and other items on the upper shelf. Later, especially for cafeterias and institutions, carts of various shapes were designed usually of metal and formed in a bin or open box configuration. The disadvantage to such a configuration was primarily the difficulty in access to the interior, especially to the bottom most items as the carts are normally approximately 3 feet in depth.

Also, cleaning of the carts was a problem due to the inaccessible corners of the cart coupled with its weight.

More recently, carts have been available which were made of plastic. However, such carts did not solve problems of cleanliness and often did not provide the adjustability required by an individual user.

Thus, it is an object of the invention to provide a new adjustable tray and dish cart providing easy access and improved ease in cleaning. It is a further object to provide adjustable and removable panels or dividers to allow customizing as desired.

It is a further object to provide a dish and tray cart having provisions for drainage so that any dampness from wet plates or trays can accumulate in a trough and be carried away from the dishes or trays.

It is a final object to provide a dish and tray cart made of a durable plastic material to reduce and prevent chipping and breaking of dishes and trays and to provide a cart having rounded corners to protect walls and furniture and to improve cleaning capability.

SUMMARY OF THE INVENTION

The dish and tray cart of the invention comprises an open top, walled movable cart having one or more removable panels or dividers therein which divide the cart into separate adjustable compartments. The cart has preferably three side walls in a generally rectangular arrangement leaving one side open for access. The base slopes from front to back which holds the dishes or trays against the back wall and drains any moisture into a trough next to the back wall. Moreover, the dividers are seated in slots formed in the base and rear wall and are secured to the back wall of the cart by screw means.

The cart is preferably formed of a durable polyethylene plastic shell filled with a rigid polyurethane foam and is provided with swivel casters attached to the bottom of the cart for movement. The resulting cart with the dividers in place provides a relatively lightweight movable cart that is structurally strong and supports items conveniently within the compartments formed by the dividers.

BRIEF DESCRIPTION OF THE DRAWINGS

The invention will be more clearly understood by reference to the description below taken with the accompanying drawings.

FIG. 1 shows a front perspective view of the cart of the invention.

FIG. 2 shows a rear perspective view of the cart of the invention.

FIG. 3 shows a front elevation view of the cart of the invention.

DETAILED DESCRIPTION OF THE DRAWINGS

Figure 7:
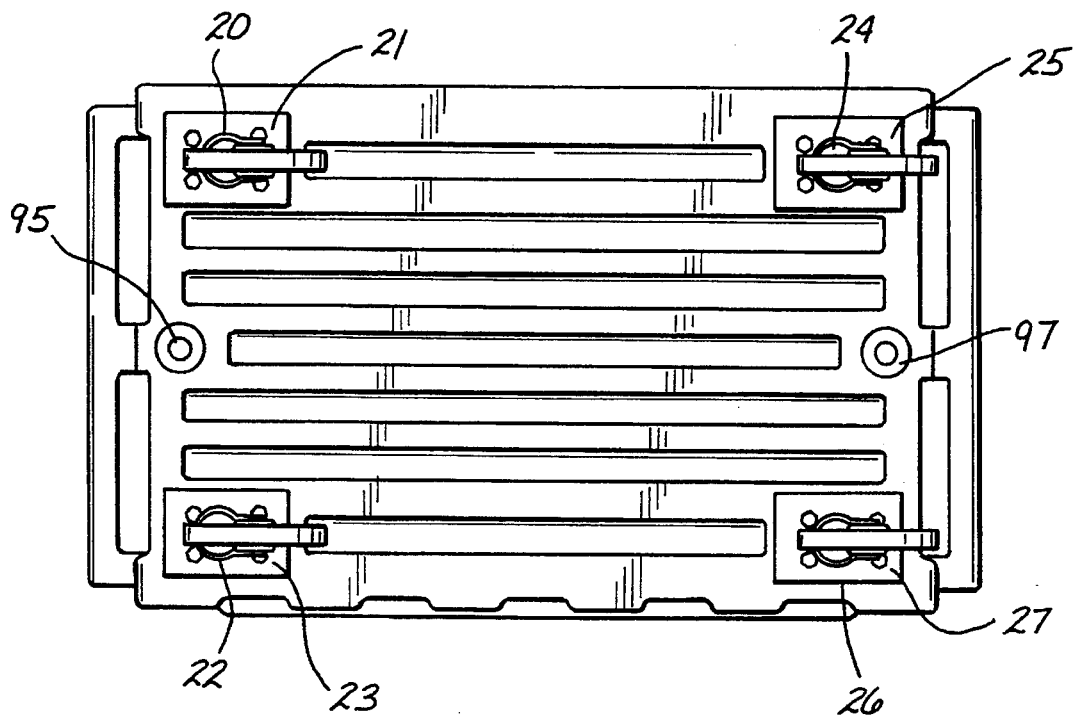
FIG. 7 shows a view of the underside of the cart.
Figure 8:
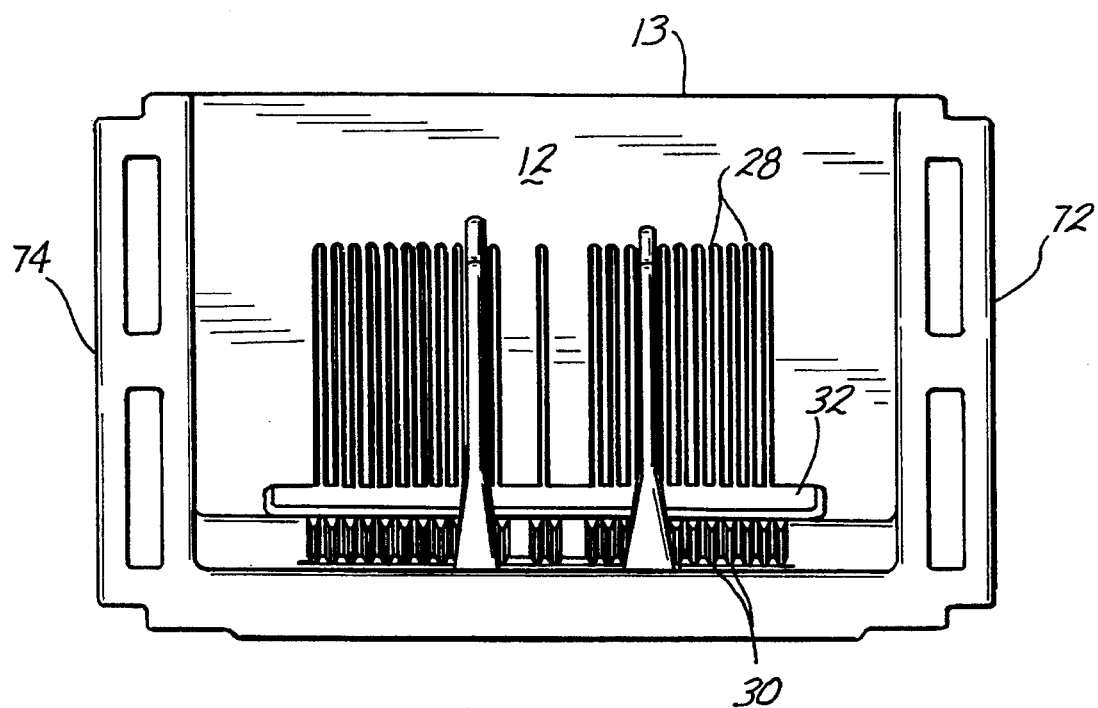
FIG. 8 shows a top plan view of the cart of the invention.

Referring now to FIGS. 1, 7, and 8, the cart generally indicated at 10 includes a base member 12 having a generally rectangular shape. Attached to the base member 12 are side walls 14 and 16 which join rear or back wall 18.

The base member 12 is provided with swivel casters 20, 22, 24, and 26. One or more of these casters can be provided with a brake, if desired, to prevent the undesired movement of the cart. The casters 20, 22, 24, and 26 are secured to metal plates 21, 23, 25, and 27 respectively which are secured to metal plates not shown which are molded internally with the base member 12.

Figure 4:
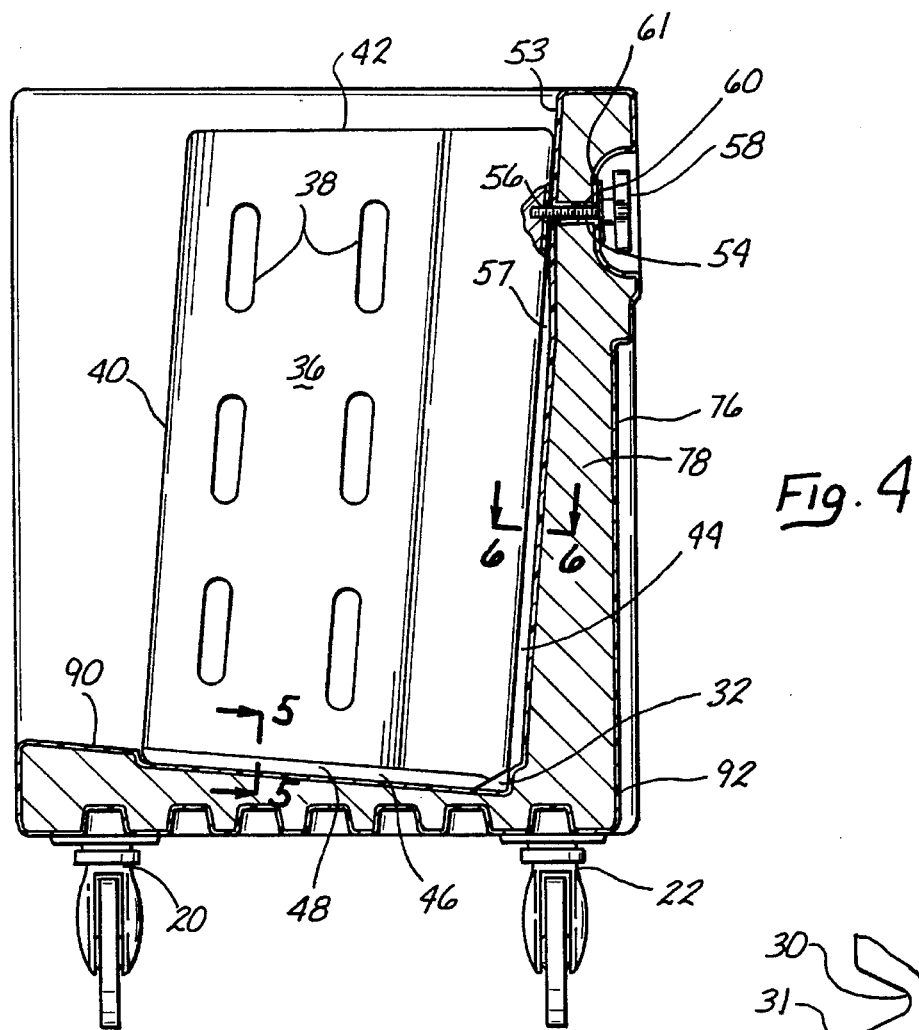
FIG. 4 shows a section taken along lines 4—4 of FIG. 3 and details the panel or divider in the cart.

Referring now to FIGS. 3, 4, and 8 it can be seen that the base member 12 is provided with slots, grooves or channels 28 and rear wall 18 is provided with vertical slots, grooves or channels 30. The grooves 28 in the base member 12 are shown running substantially perpendicular to the back wall 18 of the cart. However, other configurations of grooves can also be utilized depending upon the desired configuration.

As shown in FIG. 8, the grooves or channels 28 of base member 12 terminate in a lengthwise channel or trough 32 in the base member 12.

The purpose of the trough 32 is to allow any moisture or condensation to drain by gravity from the grooves 28 and to be gathered in the trough 32. In addition, this provides ease in cleaning.

Although there is no opening shown in the trough 32, if desired, an opening can be placed therein for ease in cleaning.

The grooves or channels 28 in the base member and the grooves or channels 30 in the rear wall 18 receive the flanged necked down, or angled edges of dividers or panels 34 and 36.

As shown in FIG. 4, the divider or panel 36 is in the form of a relatively thin panel of generally rectangular configuration.

Within the front portion of the panel 36 are a number of openings 38 which provide ease in grasping the panel for purposes of moving it as well as to provide strength during the molding process as hereinafter described.

Figure 5:
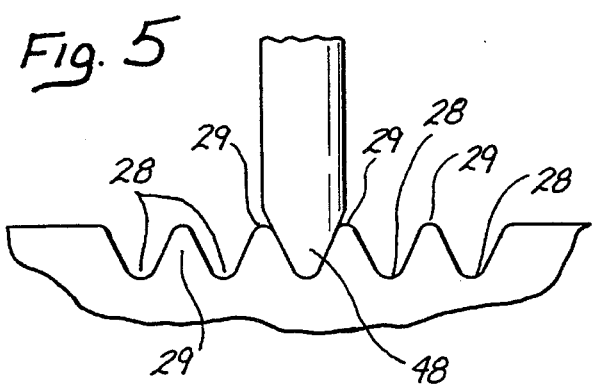
FIG. 5 shows a section taken along lines 5—5 of FIG. 4 detailing the slotted engagement of the dividers.

The panel 36 has a forward or leading edge 40, a top edge 42, a rearward or trailing edge 44 and a bottom edge 46. The bottom edge 46 of the panel 36 is formed as a flanged or angular member 48 having a configuration as shown in FIG. 5. It is sized to fit into the grooves 28 of the base member 12. As shown in FIG. 5, each of the grooves or channels 28 are separated by lands 29.

Figure 6:
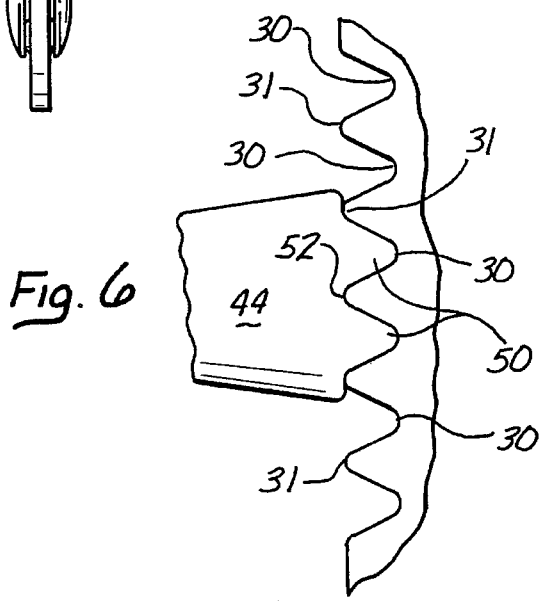
FIG. 6 shows a section taken along the lines 6—6 of FIG. 4 further detailing the slotted engagement of the dividers.

In a similar fashion, the grooves or channels 30 in the rear wall 18 of the cart 10 are separated by lands 31 as shown in FIG. 6.

The rear edge 44 of the panel or divider 36 is provided with two lands, angular portions or flanges 50 and a groove 52 disposed between the flanges which fit into the corresponding vertical grooves 30 and lands 31 in the rear wall 18 of the cart 10. The lands or flanges 50 and groove 52 extend upwardly about three quarters of the length of the rear edge 44 leaving the upper portion 57 of the edge with a flattened configuration for abutting upper rear portion 53 of rear wall 18 of cart 10. This can be seen in detail in FIG. 4.

The panel 36 is thicker at its rear edge 44 so that two flanges or lands 50 and a groove 52 are provided at the rear edge 44. This gives the upper top view of the panel 36 a wedge-like or triangular configuration as can be seen in FIGS. 1, 2, 6, and 8. While the thicker configuration with a dual flange is preferred, a single flange can also be used. In the same fashion, a dual flange can be used in place of the single flange 48 of the bottom edge 46 of the panel 36. Use of the dual flange gives greater stability and strength to the panel 36.

In addition to the placement of the flange 48 of the bottom edge 46 and flanges 50 of the rear edge 44 into the respective grooves 28 of the base member 12 and grooves 30 of the rear wall 18, the panel 36 is also secured by means of a screw member 54.

Screw member 54 passes through a slot 60 in the upper portion 53 of rear wall 18 of the cart 10 and is received into an internally threaded hole or opening 56 in the upper portion 57 of the rear side 44 of the panel 36. This is formed by a metal plate not shown which has an internally threaded opening. The metal plate is molded within the panel 36. This arrangement can be seen in FIGS. 2 and 4. As shown, the screw member 54 has a backing plate or collar 61 and a handle 58 for ease in threading the screw member 54 into the threaded receptacle 56.

As can also be seen in FIG. 2, the threaded member 54 is emplaced within a horizontal slot 60 or 62 or in the alternative placed within an aperture or hole 64. The slots 60 and 62 and hole or opening 64 are recessed or inset within the rear wall 44 of the cart 10. The recessed area or inset 66 has a generally elongated configuration but can be any configuration which is convenient. The advantages of having the screw members 54 recessed within the area 66 is to avoid the possibility of the screw member 54 catching on clothes or other items. However, this is not a necessity and the screw member could be attached through an opening which is flush with the outer wall if desired.

The purpose of the screw members 54 is to provide extra stability to the panels 34 and 36 combined with the stability provided by the flanges 48 and grooves 28 of the base member 12 and the rear flanges 50 which fit into the grooves 30 and lands 31 in the rear wall 18 of the cart 10.

The horizontal slots 60 and 62 provide particular convenience in adjusting the size of the interior compartments. For example, it is necessary only to loosen the handle 58 sufficiently to provide some moving space between the panel 34 or 36 and wall 18. Then the panel 34 or 36 is lifted from the existing grooves 28 in the base member 12 and from the grooves 30 in the rear wall 44 in order to move the panels to the desired location. It is not necessary to remove the threaded member 54 as long as the desired location is within the slot 60 or 62. At this point the handle 58 can be then tightened to securely anchor the panel 34 or 36 in place.

The opening or hole 64 permits the easy placement of a panel 36 in the center location of the cart 10. In this case, it would be necessary to unscrew the screw member 54 from the panel 34 or 36 and then replace it through the hole or aperture 64 into the threaded member 56 of a panel 36.

Although the rear wall 18 is shown with a center opening and two horizontal slots, other configurations can be used. For example, a single horizontal slot can extend horizontally across the back.

Also, while it is preferred to have the extra stability provided by the threaded screw member 54, the grooves 28 and 30 can be used alone.

It is a particular feature of the invention that the base member 12 is slanted or sloped from the opening or front side 13 of the base 12 of the cart 10 toward the rear wall 18 of the cart. As can be seen especially in FIGS. 1 and 4 this slope permits any articles such as the trays 68 and dishes 70 to rest primarily against the rear wall 18 of the cart 10. This minimizes the possibility of their tipping or falling out of the opening. In addition, the slope permits the drainage of any moisture toward the back 18 through the grooves 28 into the trough 32.

An angle of about 5° has been found to be adequate. However, other angles can be used depending on the particular application. In some instances no angle would be desirable.

In order to provide a means for grasping the cart 10 and guiding the direction of movement, the cart is provided with side rails or handles 72 and 74. If desired, the handles or rails 72 and 74 could extend around the rear wall 18 of the cart 10 but this is not preferred.

The cart 10 is preferably formed of a tough outer plastic shell 76 having an inner wall 90 and an outer wall 92 with a space between the walls which is filled interiorly with a rigid foam 78 as shown in the cross section of FIG. 4. The panels 34 and 36 are also formed of a shell filled with a rigid foam. This combination provides exterior and interior structural strength and toughness as well as light weight. In addition, the plastic allows for ease in cleaning as well as to provide a resilient surface to avoid chipping of dishes interiorly and marking of walls exteriorly.

In addition, the walls 14, 16, and 18 are provided with vertical ribs 80 and the base member 12 has ribs 82 extending lengthwise of the base member 12 to provide extra strength to the cart.

As shown in the drawings, it is preferred that all corners and edges be rounded or curved.

The most preferred plastic material is a polyethylene material which is preferably rotationally molded and then subsequently filled with a polyurethane foam. The polyurethane foam can also provide an insulating effect if desired.

Although less preferred, other methods of producing the cart can be used such as, for example, using blow molding or injection molding. Similarly while the preferred plastic is a dense polyethylene plastic other plastics can be used such as, for example, polycarbonate, polysulfone, polypropylene, ABS, and SAN among others. The exact plastic used should not limit the invention. Many plastics can be substituted for those mentioned which will be obvious to those skilled in the art.

After the shell 76 has been formed, polyurethane foam is expanded in the space between shell outer wall 92 and inner wall 90. The foam is introduced through openings 95 and 97 in the bottom surface of base member 12 as shown in FIG. 7. The foam is expanded while the shell 76 is held on a fixture. This prevents the shell 76 from bulging due to the expansion of the foam.

Once the polyurethane foam 78 has been set or cured the shell 76 can be removed from the fixture and the openings 95 and 97 filled. The cart 10 can be utilized after securing the swivel casters and panels 34 and 36.

The panels or dividers 34 and 36 are preferably made in a similar fashion.

If desired, the plastic outer shell can be replaced with a thin metal such as, for example, aluminum.

Similarly, in place of the rigid polyurethane there can be substituted other foams or other materials to fill the exterior shell.

Various modifications of the invention are contemplated which will be obvious to those skilled in the art and can be resorted to without departing from the spirit and scope of the invention as defined in the following appended claims.

I claim:

1. A movable cart comprising:

a base member having a major surface with a plurality of sides;

casters attached to said base member;

one or more walls including one rear wall attached to one of the side of said base member leaving one side open;

a plurality of channels separated by lands disposed within said base member and said rear wall;

at least one upright panel removably placed within said cart to divide said cart into compartments, each said panel having one or more edges including at least a bottom edge, and a rearward edge, said bottom edge being sized to fit within said channels of said base member, said rearward edge being formed by an enlarged portion having a plurality of rearwardly extending flanges, each flange being separated from an adjacent flange by a land and each flange being sized to fit within said channels of said rear wall; and, means attached to said at least one panel and said rear wall for removably securing said panel to said rear wall.

2. A cart according to claim 1 further comprising:

said base member having a trough in communication with said channels of said base member to provide drainage from said channels to said trough.

3. A cart according to claim 2, further comprising:

said channels of said base member being disposed perpendicular to and extending toward said rear wall and terminating in said trough.

4. A cart according to claim 3 further comprising:

said base member having an upper surface which slopes from said open side toward said trough.

5. A cart according to claim 4 further comprising:

said panels having a double flanged edge sized to fit into said channels of said rear wall, said panel being thicker in the vicinity of said double flanges than in the body of the panel.

6. A cart according to claim 5 further comprising:

said cart and panels being formed of a plastic.

7. A cart according to claim 6 further comprising:

said cart and panels being formed of a plastic shell having a rigid foamed plastic core.

8. (amended) A dish and tray cart according to claim 1 further comprising:

said base member having a substantially curved periphery.

9. A movable cart according to claim 1 wherein said cart has at least one opening within said walls for accessing said compartments.

10. A movable cart according to claim 9 wherein said cart comprises a generally rectangular base member having two side walls adjoining a rear wall which walls are disposed around three sides of the periphery of the base member and wherein said base member slopes downwardly toward said rear wall.

11. A movable cart according to claim 10 wherein said channels within said base member slope toward said rear wall and terminate in a trough within said base member which extends across said channels in said base member.

12. A movable cart according to claim 11 wherein said walls and base member are formed of a plastic shell filled with a rigid foamed plastic core, and further comprising hand rails attached to said walls.

13. A movable cart comprising:

a base member formed of an inner wall and an outer wall defining a shell filled with a rigid foam and having a generally rectangular shape including a front, back and side edges, said base member being supported on a plurality of swivel casters;

two upright side walls adjoining an upright rear wall and attached to said base member, each wall formed of an inner wall and an outer wall defining a shell filled with a rigid foam;

said inner wall of said base member sloping from said front edge to said rear wall;

said inner wall of said base member having a plurality of grooves separated by lands and extending perpendicularly toward said rear wall;

said inner wall of said rear wall having a plurality of grooves separated by lands extending in an upright direction and substantially aligned with said grooves and lands of said base member;

said base member grooves terminating in a lengthwise trough;

one or more upright divider panels formed of an inner wall and an outer wall defining a shell filled with a rigid foam, each panel having one or more edges including a bottom edge, and a rear edge, said bottom edge being sized to fit within said grooves of said base member, said rearward edge being formed by an enlarged portion having a plurality of rearwardly extending flanges, each flange being separated from an adjacent flange by a land and each flange being sized to fit within said grooves of said rear wall;

at least a portion of said rear edge of said divider panels having a flattened edge; and, means attached to said flattened edge of said panel and means attached to said rear wall for removably receiving and securing said panel to said rear wall.

14. A cart according to claim 13 further comprising:

a threaded opening within said flattened edge of said divider panel;

a generally horizontal lengthwise slot partially recessed within said outer wall of said rear wall and being generally aligned with the threaded opening in said divider panel when said divider panel is emplaced within said base member or rear wall channels; and, an exteriorly threaded member disposed within said slot for threading into said threaded opening in said divider panel.

* * * * *